(12) United States Patent
Li et al.

(10) Patent No.: US 11,994,071 B2
(45) Date of Patent: May 28, 2024

(54) FUEL SYSTEM HAVING A COKE FILTRATION SYSTEM

(71) Applicant: General Electric Company, Schenectady, NY (US)

(72) Inventors: Hejie Li, Mason, OH (US); Mathew Paul Thariyan, Clifton Park, NY (US); Diana Julieta Méndez Maya, Querétaro (MX); Jorge Omar Mañón Cantú, Querétaro (MX); Brandon W. Miller, Middletown, OH (US); Michael A. Benjamin, Cincinnati, OH (US); Brian Devendorf, Georgetown, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 63 days.

(21) Appl. No.: 17/652,790

(22) Filed: Feb. 28, 2022

(65) Prior Publication Data

US 2023/0272749 A1 Aug. 31, 2023

(51) Int. Cl.
*F02C 7/224* (2006.01)
*F02C 7/12* (2006.01)

(52) U.S. Cl.
CPC .............. *F02C 7/224* (2013.01); *F02C 7/12* (2013.01)

(58) Field of Classification Search
CPC .. F02C 7/22; F02C 7/222; F02C 7/224; F02C 7/236; F23K 2300/202
See application file for complete search history.

(56) References Cited

U.S. PATENT DOCUMENTS

| 2,729,338 A | * | 1/1956 | Heigl | B01D 35/12 |
| | | | | 210/186 |
| 2,925,712 A | * | 2/1960 | Johnson | F02C 7/224 |
| | | | | 60/785 |
| 3,750,396 A | | 8/1973 | Tucker | |

(Continued)

FOREIGN PATENT DOCUMENTS

| CN | 201701805 U | * | 1/2011 | ........... B01D 36/003 |
| CN | 105688514 A | * | 6/2016 | ........... B01D 36/003 |

(Continued)

OTHER PUBLICATIONS

English translation of CN105688514A (Year: 2016).*

(Continued)

*Primary Examiner* — Scott J Walthour
(74) *Attorney, Agent, or Firm* — Venable LLP; David D. Leege; Michele V. Frank

(57) ABSTRACT

A fuel system including a fuel metering unit, a heat exchanger, a plurality of fuel nozzles, and a coke filtration system. The fuel metering unit is configured to meter a flow of a hydrocarbon fuel. The heat exchanger is fluidly connected to the fuel metering unit. The heat exchanger is configured to heat the hydrocarbon fuel to improve engine performance or efficiency. The plurality of fuel nozzles is fluidly connected to the heat exchanger downstream of the heat exchanger to receive the hydrocarbon fuel heated by the heat exchanger. The coke filtration system includes at least one filter to remove coke particles in the heated fuel. The coke filtration system is located upstream of the plurality of fuel nozzles and directly downstream of the heat exchanger.

19 Claims, 6 Drawing Sheets

(56) References Cited

U.S. PATENT DOCUMENTS

| | | | |
|---|---|---|---|
| 8,234,870 B2 | 8/2012 | Gage | |
| 10,024,239 B2 | 7/2018 | Turcotte | |
| 10,049,444 B2 | 8/2018 | Jones et al. | |
| 10,495,002 B2 | 12/2019 | Cordatos et al. | |
| 2006/0196822 A1* | 9/2006 | Koehler | B01D 29/055 |
| | | | 210/437 |
| 2012/0024403 A1* | 2/2012 | Gage | F02C 7/222 |
| | | | 137/561 R |
| 2016/0031566 A1* | 2/2016 | Ribarov | B01D 35/18 |
| | | | 210/336 |
| 2016/0201563 A1* | 7/2016 | Stearns | F02C 7/224 |
| | | | 60/776 |
| 2018/0372321 A1 | 12/2018 | Yates et al. | |
| 2020/0140111 A1* | 5/2020 | O'Connor | F02C 7/222 |
| 2020/0140114 A1 | 5/2020 | Andrews, Jr. et al. | |

FOREIGN PATENT DOCUMENTS

| | | | | |
|---|---|---|---|---|
| EP | 0897863 A3 | 11/1999 | | |
| EP | 3269962 A1 | 1/2018 | | |
| EP | 3246628 B1 * | 3/2021 | | F02C 7/228 |
| KR | 100745504 B1 | 8/2007 | | |

OTHER PUBLICATIONS

English translation of CN201701805U (Year: 2011).*
English translation of EP3246628 (Year: 2021).*
Sobel, et al. "Deposit Formation and Mitigation in Aircraft Fuels," The American Society of Mechanical Engineers, p. 1-7, 2019.

* cited by examiner

FUEL SYSTEM HAVING A COKE FILTRATION SYSTEM

TECHNICAL FIELD

The present disclosure relates to fuel systems, particularly, fuel systems for gas turbine engines for aircraft. In more detail, the present disclosure relates to a fuel system for a gas turbine engine, the fuel system having a coke filtration system.

BACKGROUND

Gas turbine engines include surfaces that contact hydrocarbon fluids, such as fuels and lubricating oils. Carbonaceous deposits (also known as coke) may form on these surfaces when exposed to the hydrocarbon fluids at elevated temperatures, resulting in carbon becoming attached and building up as deposits on surfaces contacted by a fuel or oil.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 5A is a schematic, cross-sectional view of the filter, and FIG. 5B is a schematic, cross-sectional view of a plurality of filter elements of a filter assembly according to an embodiment of the present disclosure. FIG. 5B is a detail view showing detail 5B in FIG. 5A.

DETAILED DESCRIPTION

Figure 1:
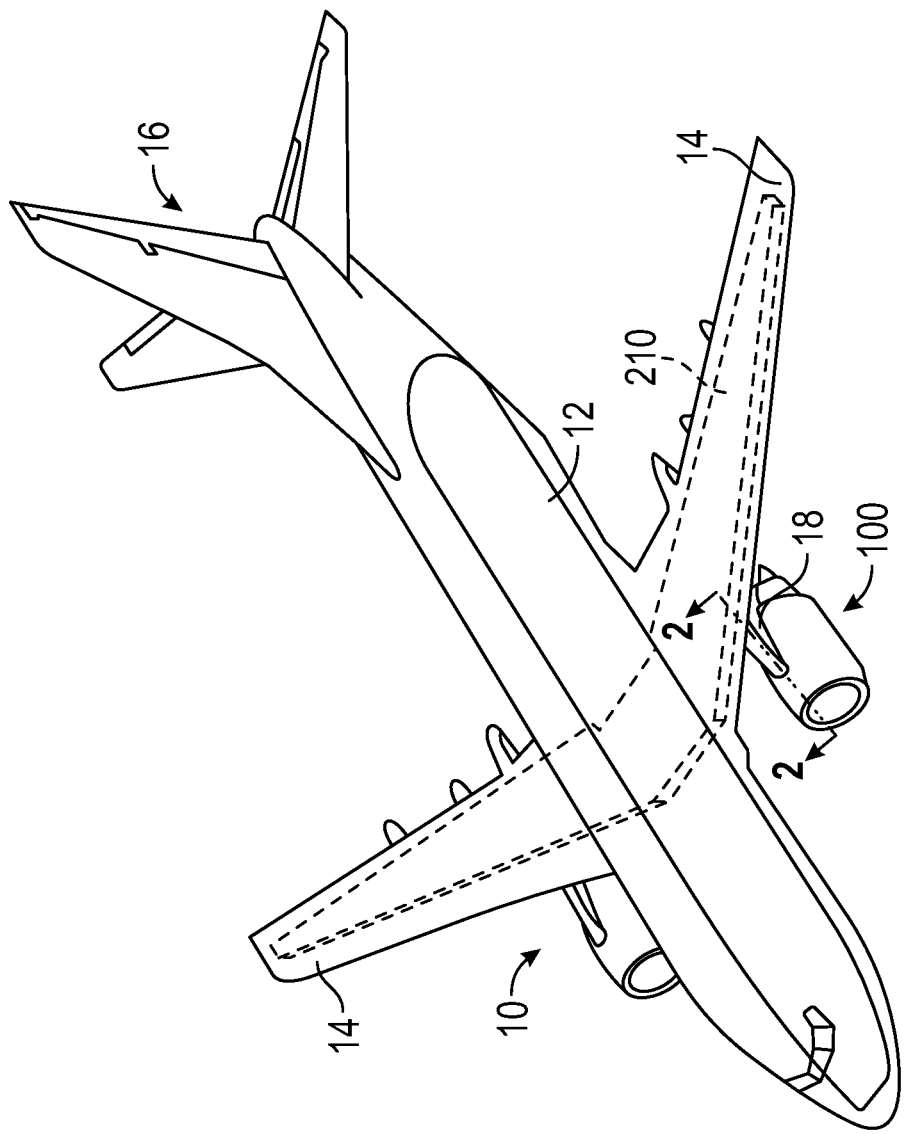
FIG. 1 is a schematic perspective view of an aircraft having a gas turbine engine according to an embodiment of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "directly upstream" or "directly downstream," when used to describe the relative placement of components in a fluid pathway, refer to components that are placed next to each other in the fluid pathway without any intervening components between them other than an appropriate fluid coupling, such as a pipe, tube, valve, or the like, to fluidly couple the components. Such components may be spaced apart from each other with intervening components that are not in the fluid pathway.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values, and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

As noted above, coke deposition may occur on surfaces of a gas turbine engine that are exposed to hydrocarbon fluids, such as fuels and lubricating oils, at elevated temperatures. As the deposits collect, they can become sufficiently large to reduce or even to obstruct fluid flow. In the case of a fuel circuit, such carbon deposition can lead to degraded engine performance, reduced heat transfer efficiencies, increased pressure drops, and increased rates of material corrosion and erosion, all of which can necessitate the use of expensive de-coking procedures and even replacement of fuel nozzles. The formation of these carbonaceous deposits is accelerated at elevated temperatures, such as temperatures between four hundred degrees Fahrenheit and eight hundred degrees Fahrenheit. Heating fuel to such temperatures just prior to being injected into a combustion chamber of a gas turbine engine may be beneficial for performance reasons. To avoid coke deposition in the fuel nozzles leading to frequent replacement of the fuel nozzles, the fuel system of preferred embodiments discussed herein use a filtration system between a heat exchanger used to heat the fuel and the fuel nozzles to remove coke before the coke reaches the fuel nozzles.

The fuel system discussed herein is particularly suitable for use in engines, such as a gas turbine engine used on an aircraft. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 200 (see FIG. 3). An aviation turbine fuel in the embodiments discussed herein is a combustible hydrocarbon liquid fuel, such as a kerosene-type fuel, having a desired carbon number, a synthetic aviation fuel, a biofuel, a biodiesel, an ethanol, a bioalcohol, and the like. The fuel is stored in a fuel tank 210 of the fuel system 200. As shown in FIG. 1, at least a portion of the fuel tank 210 is located in each wing 14 and a portion of the fuel tank 210 is located in the fuselage 12 between the wings 14. The fuel tank 210, however, may be located at other suitable locations in the fuselage 12 or the wing 14. The fuel tank 210 may also be located entirely within the fuselage 12 or the wing 14. The fuel tank 210 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft, including, for example, helicopters and unmanned aerial vehicles (UAV). Preferably, the aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible). Further, although not depicted herein, in other embodiments, the gas turbine engine may be any other suitable type of gas turbine engine, such as an industrial gas turbine engine incorporated into a power generation system, a nautical gas turbine engine, etc.

Figure 2:
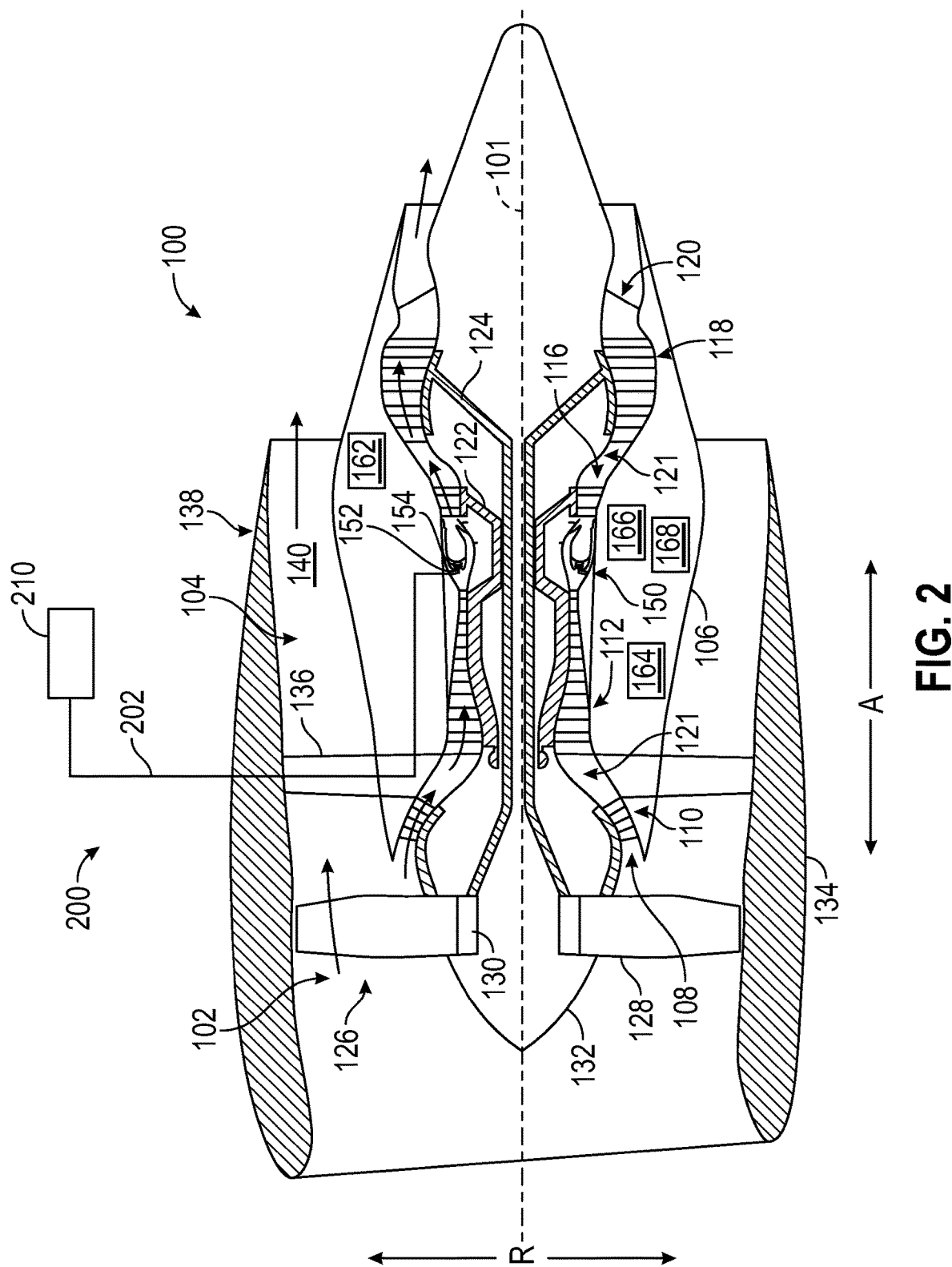
FIG. 2 is a schematic, cross-sectional view, taken along line 2-2 in FIG. 1, of the gas turbine engine of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. For the embodiment depicted in FIG. 2, the engine 100 is a high bypass turbofan engine. The engine 100 may also be referred to as a turbofan engine 100 herein. The turbofan engine 100 has an axial direction A (extending parallel to a longitudinal centerline 101, shown for reference in FIG. 2), a radial direction R (extending perpendicular to the longitudinal centerline 101, shown for reference in FIG. 2), and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

The turbomachine 104 depicted in FIG. 2 includes a tubular outer casing 106 (also referred to as a housing or nacelle) that defines an inlet 108. In this embodiment, the inlet 108 is annular. The outer casing 106 encases an engine core that includes, in a serial flow relationship, a compressor section including a booster or low-pressure (LP) compressor 110 and a high-pressure (HP) compressor 112, a combustion section 150 (also referred to herein as a combustor 150), a turbine section including a high-pressure (HP) turbine 116 and a low-pressure (LP) turbine 118, and a jet exhaust nozzle section 120. The compressor section, the combustion section 150, and the turbine section together define at least in part a core air flowpath 121 extending from the inlet 108 to the jet exhaust nozzle section 120. The turbofan engine further includes one or more drive shafts. More specifically, the turbofan engine includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The fan section 102 shown in FIG. 2 includes a fan 126 having a plurality of fan blades 128 coupled to a disk 130. The fan blades 128 and the disk 130 are rotatable, together, about the longitudinal centerline (axis) 101 by the LP shaft 124. The LP compressor 110 may also be directly driven by the LP shaft 124, as depicted in FIG. 2. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The turbofan engine 100 is operable with the fuel system 200 and receives a flow of fuel from the fuel system 200. As will be described further below, the fuel system 200 includes a fuel delivery assembly 202 providing the fuel flow from the fuel tank 210 to the turbofan engine 100, and, more specifically, to a plurality of fuel nozzles 152 that inject fuel into a combustion chamber 154 of the combustor 150.

As discussed above, the compressor section, the combustion section (combustor) 150, and the turbine section form, at least in part, the core air flowpath 121 extending from the inlet 108 to the jet exhaust nozzle section 120. Air entering through the inlet 108 is compressed by blades of a plurality of fans of the LP compressor 110 and the HP compressor 112. At least a portion of the compressed air enters (as primary air) the forward end of the combustion chamber 154 of the combustor 150. Fuel is injected by the fuel nozzles 152 into compressed air and mixed with the compressed, primary air. The fuel nozzles 152 of this embodiment are part of a swirler/fuel nozzle assembly. The swirler/fuel nozzle assembly includes a swirler (not shown) that is used to generate turbulence in the primary air. The fuel nozzle 152 injects fuel into the turbulent airflow of the primary air and the turbulence promotes rapid mixing of the fuel with the primary air. The mixture of fuel and compressed air is combusted in the combustion chamber 154, generating combustion gases (combustion products), which accelerate as the combustion gases leave the combustion chamber 154. The products of combustion are accelerated as the products are expelled through the outlet of the combustion chamber 154 to drive the engine 100. More specifically, the combusted fuel air mixture is accelerated through the outlet to turn the turbines (e.g., drive the turbine blades) of the HP turbine 116 and the LP turbine 118. As discussed above, the HP turbine 116 and the LP turbine 118, among other things, drive the LP compressor 110 and the HP compressor 112.

The turbofan engine 100 also includes various accessory systems to aid in the operation of the turbofan engine 100 and/or an aircraft, including the turbofan engine 100. For example, the turbofan engine 100 may include a main lubrication system 162, a compressor cooling air (CCA) system 164, an active thermal clearance control (ATCC) system 166, and generator lubrication system 168, each of which is depicted schematically in FIG. 2. The main lubrication system 162 is configured to provide a lubricant to, for example, various bearings and gear meshes in the compressor section, the turbine section, the HP shaft 122, and the LP shaft 124. The lubricant provided by the main lubrication system 162 may increase the useful life of such components and may remove a certain amount of heat from such components through the use of one or more heat exchangers. The compressor cooling air (CCA) system 164 provides air from one or both of the HP compressor 112 or the LP compressor 110 to one or both of the HP turbine 116 or the LP turbine 118. The active thermal clearance control (ATCC) system 166 acts to minimize a clearance between tips of turbine blades and casing walls as casing temperatures vary during a flight mission. The generator lubrication system 168 provides lubrication to an electronic generator (not shown), as well as cooling/heat removal for the electronic generator. The electronic generator may provide electrical power to, for example, a startup electrical motor for the turbofan engine 100 and/or various other electronic components of the turbofan engine 100 and/or an aircraft including the turbofan engine 100. The lubrication systems for the engine 100 (e.g., the main lubrication system 162 and the generator lubrication system 168) may use hydrocarbon fluids, such as oil, for lubrication, in which the oil circulates through inner surfaces of oil scavenge lines.

It will be appreciated, however, that the turbofan engine 100 discussed herein is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, it will further be appreciated that, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and shaft driving the fan 126, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 162, 164, 166, 168, discussed above.

Figure 3:
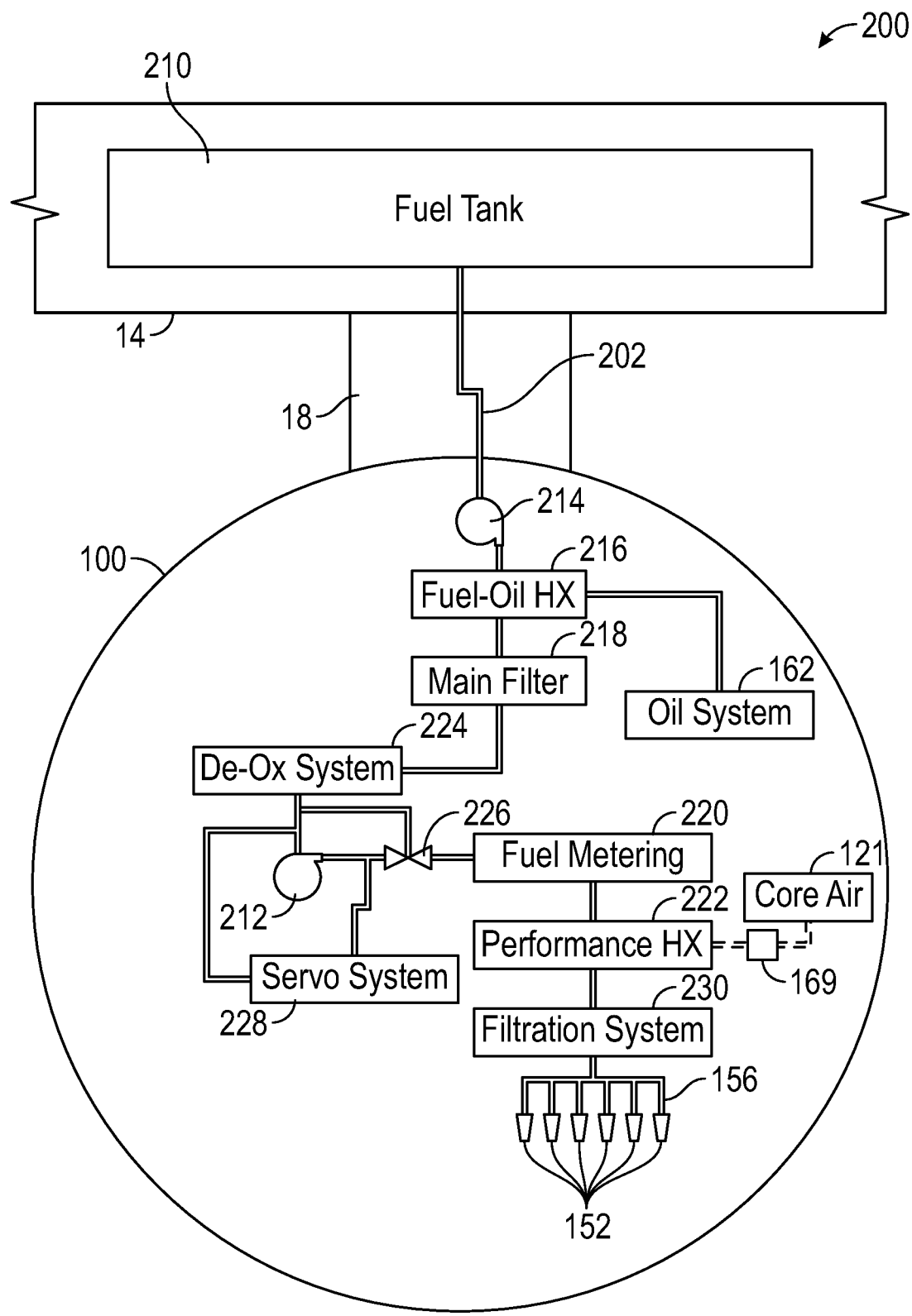
FIG. 3 is a schematic of a fuel system for the gas turbine engine according to an embodiment of the present disclosure.

FIG. 3 is a schematic view of the fuel system 200 according to an embodiment of the present disclosure that is configured to store the hydrocarbon fuel for the engine 100 in the fuel tank 210 and to deliver the hydrocarbon fuel to the engine 100 via the fuel delivery assembly 202. In the following discussion, various components are described as being fluidly connected to the fuel delivery assembly 202 or in fluid connection to the fuel delivery assembly 202. These components are also fluidly connected or coupled to each other by, for example, the fuel delivery assembly 202. Various components are also described as being positioned downstream or upstream from other components. A component positioned downstream from another component is configured to receive fuel from the other component, and, likewise, a component positioned upstream of another component is configured to provide fuel to the other component.

The fuel delivery assembly 202 includes tubes, pipes, conduits, and the like, to fluidly connect the various components of the fuel system 200 to the engine 100. As noted above, the fuel tank 210 is configured to store the hydrocarbon fuel, and the hydrocarbon fuel is supplied from the fuel tank 210 to the fuel delivery assembly 202. The fuel delivery assembly 202 is configured to carry the hydrocarbon fuel between the fuel tank 210 and the engine 100 and, thus, provides a flow path (fluid pathway) of the hydrocarbon fuel from the fuel tank 210 to the engine 100. As noted above, the terms "downstream" and "upstream," as used herein, may be used to describe the position of components relative to the direction of flow of the hydrocarbon fuel in the flow path of the fuel delivery assembly 202. The fuel delivery assembly 202 may also include various valves and other components to deliver the hydrocarbon fuel to the engine 100 that are not shown in FIG. 3.

The fuel system 200 includes at least one fuel pump, and, in the embodiment shown in FIG. 3, a plurality of fuel pumps, fluidly connected to the fuel delivery assembly 202 to induce the flow of the fuel through the fuel delivery assembly 202 to the engine 100. One such pump is a main fuel pump 212. The main fuel pump 212 is a high-pressure pump that is the primary source of pressure rise in the fuel delivery assembly 202 between the fuel tank 210 and the engine 100. The main fuel pump 212 may be configured to increase a pressure in the fuel delivery assembly 202 to a pressure greater than a pressure within the combustion chamber 154 of the combustor 150.

The fuel system 200 may also include other supplementary pumps, such as an inlet pump 214. The inlet pump 214 is a low-pressure pump that is configured to provide an initial pressurization to induce a flow of the hydrocarbon fuel through the fuel delivery assembly 202. The inlet pump 214 may be configured to provide less of a pressure rise within the fuel delivery assembly 202 than the main fuel pump 212. The inlet pump 214 may be configured to provide less than 80% of the pressure rise of the main fuel pump 212, such as less than 70%, such as less than 60%, such as less than 50%, such as less than 40%, such as less than 30%, such as less than 20%, such as at least 5% of the pressure rise of the main fuel pump 212.

In the embodiment shown in FIG. 3, the inlet pump 214 is downstream of the fuel tank 210 and upstream of the main fuel pump 212. Although the inlet pump 214 is shown as being located within the engine 100, the inlet pump 214 may also be suitably located in other portions of the aircraft 10 such as the fuselage 12, the wing 14, or the pylon 18. The inlet pump 214 induces the flow of fuel from the fuel tank 210, and, then, the fuel is heated by a preheater 216.

The preheater 216 is in fluid communication with the fuel delivery assembly 202 and may be any suitable heater, such as an electrical resistance heater, a catalytic heater, or a burner. In some embodiments, such as the one depicted in FIG. 3, the preheater 216 may be a heat exchanger that is in thermal communication with any suitable heat source, such as any suitable engine and/or aircraft heat source. Such engine heat source may include, for example, the main lubrication system 162, and the preheater 216 may be a fuel-oil heat exchanger (HX) fluidly connected to the main lubrication system 162 and configured to extract heat from the oil of the main lubrication system 162 and to heat the hydrocarbon fuel flowing through the preheater 216. The preheater 216 is preferably configured to heat the fuel to temperatures that avoid the formation of ice in the fuel and to cool the oil of the main lubrication system 162. The preheater 216 may be configured to heat the fuel, as measured at the outlet of the preheater 216, to temperatures preferably from zero degrees Fahrenheit to two-hundred degrees Fahrenheit. Although, the preheater 216 is shown as being located within the engine 100, the preheater 216 may also be suitably located in other portions of the aircraft 10 such as the fuselage 12, the wing 14, or the pylon 18.

The fuel system 200 also includes a main filter 218 in fluid communication with the fuel delivery assembly 202. The main filter 218 is configured to remove contaminates that may be present in the fuel supply and is, thus, preferably positioned close to the fuel tank 210 and upstream of many of the major components of the fuel system 200, such as, for example, the main fuel pump 212, a fuel metering unit 220, a de-oxygenation system 224, and a servo system 228. In the embodiment depicted in FIG. 3, the main filter 218 is positioned downstream of the fuel tank 210, the inlet pump 214, and the preheater 216. Although the main filter 218 is shown as being located within the engine 100, the main filter 218 may also be suitably located in other portions of the aircraft 10 such as the fuselage 12, the wing 14, or the pylon 18. The main filter 218 may be any suitable filter including, for example, a mesh filter. The main filter 218 preferably may have a nominal micron rating from ten microns to fifty microns to remove potential contaminants.

The fuel system 200 also includes a fuel metering unit 220 in fluid communication with the fuel delivery assembly 202. Any suitable fuel metering unit 220 may be used including, for example, a metering valve. The fuel metering unit 220 is positioned downstream of the main fuel pump 212 and upstream of a fuel manifold 156 configured to distribute fuel to the fuel nozzles 152. The fuel system 200 is configured to provide fuel to the fuel metering unit 220, and the fuel metering unit 220 is configured to receive fuel from the fuel tank 210. The fuel metering unit 220 is further configured to provide the flow of fuel to the engine 100 in a desired manner. More specifically, the fuel metering unit 220 is configured to meter the fuel and to provide a desired volume of fuel, at, for example, a desired flow rate, to the fuel manifold 156 of the engine 100. The fuel manifold 156 is fluidly connected to the fuel nozzles 152 and distributes (provides) the fuel received to the plurality of fuel nozzles 152, where, as discussed above, the fuel is injected into the combustion chamber 154 and combusted. Adjusting the fuel metering unit 220 changes the volume of fuel provided to the combustion chamber 154 and, thus, changes the amount of propulsive thrust produced by the engine 100 to propel the aircraft 10.

Fuel after fuel metering unit 220 may be heated further to improve gas turbine efficiency, performance, and durability. Fuel may be used as a cooling source to improve aircraft or engine components durability or used to extract heat from core air flowpath 121 or the CCA system 164 to improve engine thermodynamic efficiency. The fuel system 200 of this embodiment further includes a heat exchanger 222, which may be referred to as performance heat exchanger (HX) herein. The performance heat exchanger 222 may be configured to heat the fuel to temperatures greater than three hundred fifty degrees Fahrenheit, more preferably, from four hundred degrees Fahrenheit to nine hundred degrees Fahrenheit. The performance heat exchanger 222 is positioned upstream of the fuel nozzles 152 and, more specifically, upstream of the fuel manifold 156. With the high temperature fuel produced using the performance heat exchanger 222, the performance heat exchanger 222 is preferably located close to the fuel manifold 156, minimizing the number of intervening components in the fuel system 200 between the performance heat exchanger 222 and the fuel nozzles 152. The performance heat exchanger 222 is located downstream of the fuel metering unit 220 and, more specifically, directly downstream of the fuel metering unit 220.

The performance heat exchanger 222 may be a heat exchanger that is in thermal communication with any suitable heat source, such as any suitable engine and/or aircraft heat source. The heat exchanger may be in thermal communication with a hot gas path of an engine 100. Such engine heat source may include, for example, a flow path of heated air through the engine 100, such as the core air flowpath 121. The performance heat exchanger 222 also may be fluidly connected to, for example, the CCA system 164 to cool the HP turbine 116. The performance heat exchanger 222 may be thermally connected to other portions of the core air flowpath 121 (FIG. 2), including the jet exhaust nozzle section 120 (FIG. 2). Additionally, or alternatively, in other embodiments, the performance heat exchanger 222 may be thermally coupled to an intermediate thermal transfer system 169, which is in turn thermally coupled to one or more systems of the engine 100, or a flowpath for air through the engine 100. The performance heat exchanger 222 may be thermally coupled to the intermediate thermal transfer system 169 to receive heat from these heat sources.

The performance heat exchanger 222 elevates the temperature of the hydrocarbon fuel to temperatures that, as discussed above, promote coke formation and deposition on, for example, the fuel nozzles 152. To lengthen the life of the fuel nozzles 152, the fuel system 200 of this embodiment also includes a coke filtration system 230 in fluid communication with the fuel delivery assembly 202. The coke filtration system 230 is configured to collect coke before the coke deposits on other components, such as the fuel nozzles 152, and will be referred to herein as a coke filtration system. In this embodiment, the coke filtration system 230 is positioned downstream of the performance heat exchanger 222, and more specifically, directly downstream of the performance heat exchanger 222, thus, collecting the coke before the coke deposits on other components. The coke filtration system 230 is positioned upstream of the fuel manifold 156 and the combustion chamber 154 (FIG. 2). As noted above, the performance heat exchanger 222 is positioned close to the fuel manifold 156 and, in this embodiment, the coke filtration system 230 is positioned directly upstream of the fuel manifold 156 placing only the coke filtration system 230 between the performance heat exchanger 222 and the fuel manifold 156.

Figure 4:
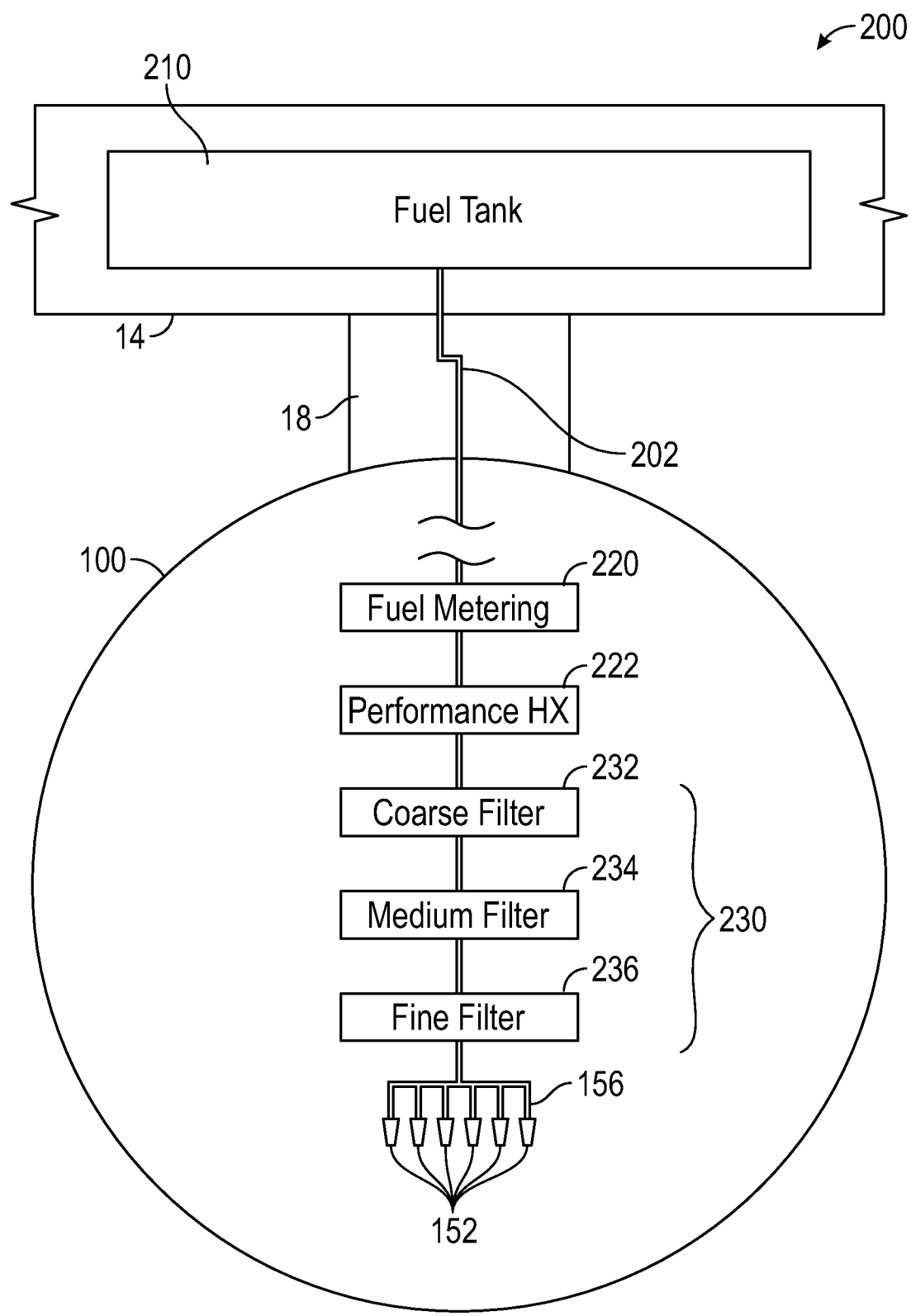
FIG. 4 is a schematic of the coke filtration system of the fuel system shown in FIG. 3.

FIG. 4 is a schematic of the coke filtration system 230. The coke filtration system 230 is configured to collect the coke and may include at least one filter configured to collect the coke. In some embodiments, only a single filter may be used, but, with a single filter sized to collect fine particles of coke, the lifetime (time on wing) may be limited as particles may collect rapidly. In this embodiment, the coke filtration system 230 includes a plurality of filters, and, more specifically, a coarse filter 232, a medium filter 234, and a fine filter 236. The filters 232, 234, 236 are arranged in series, with the micron rating of the filters being progressively lower corresponding to the direction of the flow of the fuel, such that the coarse filter 232 has a micron rating greater than the medium filter 234 and the medium filter 234 has a micron rating greater than the fine filter 236. Accordingly, the coarse filter 232 has a micron rating larger than the fine filter 236. As is known in the art and as will be used herein, micron rating describes the size of particles that a filter can capture. Larger particles in the fuel, including larger particles of coke, are first collected by the coarse filter 232. The medium filter 234 collects some particles that pass through the coarse filter 232, and the fine filter 236 collects the small particles of coke that pass through both the coarse filter 232 and the medium filter 234. By such an arrangement, a fine level of filtration can be obtained, but the life of the fine filter 236 can be extended relative to a single filter arrangement. In some embodiments, the coarse filter 232 may preferably have a nominal micron rating from thirty microns to eighty microns. The medium filter 234 may preferably have a nominal micron rating from fifteen microns to sixty microns. As noted above, the fine filter 236 is preferably sized to collect small particles of coke, and the fine filter 236 preferably has a nominal micron rating from a half micron to forty microns.

Figure 5B:
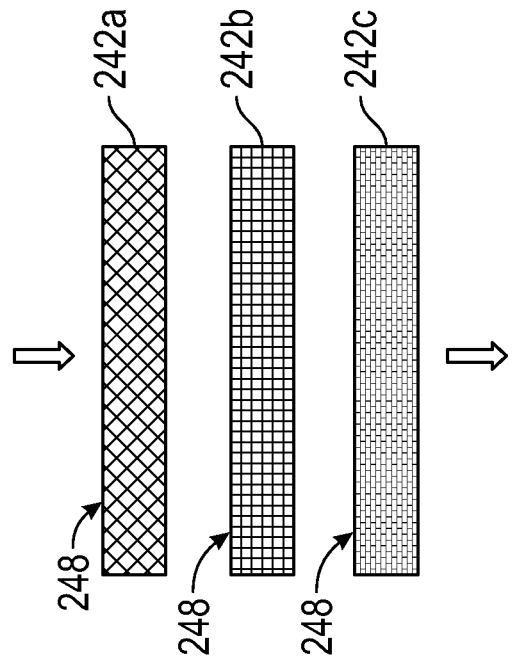
FIGS. 5A and 5B show a filter assembly that may be used in the coke filtration system.
Figure 5A:
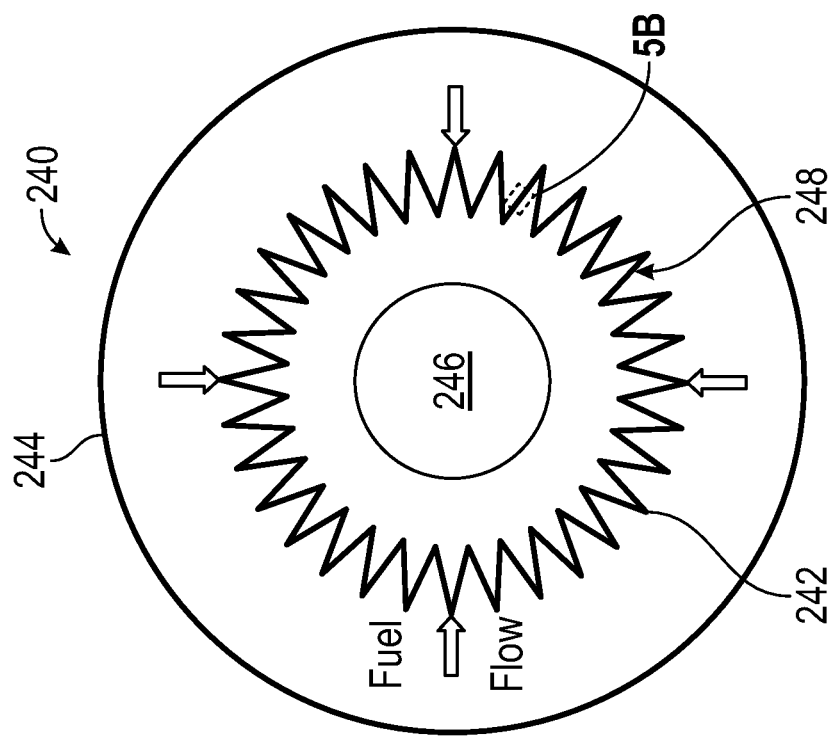

FIG. 5A is a schematic, cross-sectional view of a filter assembly 240 that may be used in the coke filtration system 230 of FIGS. 3 and 4. The filter assembly 240 includes a filter element 242 that collects the small particles of coke in the fuel. The filter element 242 is located within a filter housing 244 of the filter assembly 240. In the embodiment shown in FIG. 5A, the filter element 242 and the filter housing 244 are cylindrical having a longitudinal direction that is in and out of the page, a radial direction orthogonal to the longitudinal direction, and a circumferential direction. The filter element 242 is also annular having a filter bore 246 in the center of the filter element 242. In this embodiment, the filter bore 246 is circular having a longitudinal axis coincident with a longitudinal axis of the filter element 242. In this embodiment, fuel flows into the filter assembly 240 within the filter housing 244 and then flows radially inward through the filter element 242 into the filter bore 246. The filter element 242 has an upstream surface 248, which in the embodiment shown in FIG. 5A, is the circumferential surface of the filter element 242 that faces radially outward toward the filter housing 244. Each of the filters 232, 234, 236 (FIG. 4) is preferably designed to have a large surface area to maximize the lifetime of the filter, and although, in some embodiments, the filter assembly 240 could be designed to have fuel flow in a radially outward direction, the fuel flows in a radially inward direction to increase the surface area of the upstream surface 248. In some embodiments, the upstream surface 248 (or even the entire filter element 242) may be pleated to further increase the surface area for a given volume, as shown in FIG. 5A.

As noted above with regard to FIG. 4, the filters 232, 234, 236 are preferably arranged in series. In some embodiments, each of the filters 232, 234, 236 may have separate filter assemblies 240. For example, the fuel may flow through an inlet of the coarse filter 232, radially inward through the filter element 242 of the coarse filter 232 to the filter bore 246 of the coarse filter 232, and then to an outlet of the coarse filter 232 before preceding sequentially in a similar manner through the medium filter 234 and the fine filter 236. In other embodiments, the filter elements 242 of each of the coarse filter 232, the medium filter 234, and the fine filter 236 may be radially nested with each other. FIG. 5B shows such an arrangement, and FIG. 5B is a detail view showing detail 5B in FIG. 5A. In the arrangement illustrated by FIG. 5B, the filter assembly 240 includes a plurality of filter elements 242 nested with each other. With the fuel flowing in the radially inward direction, a filter element 242a of the coarse filter 232 (coarse filter element 242a) is the outward most filter element 242. A filter element 242b of the medium filter 234 (medium filter element 242b) is positioned radially inward of the coarse filter element 242a, and a filter element 242c of the fine filter 236 (fine filter element 242c) is positioned radially inward of both the coarse filter element 242a and the medium filter element 242b. The medium filter element 242b is located between the coarse filter element 242a and the fine filter element 242c. In this embodiment, as the fuel flows in the radially inward direction, the fuel flows sequentially through each of the coarse filter 232, the medium filter 234, and the fine filter 236, and more specifically sequentially through each of the coarse filter element 242a, the medium filter element 242b, and the fine filter element 242c, and then through the filter bore 246 of the fine filter 236 to the outlet of the filter assembly 240.

The filter element 242 may have any suitable construction such as, for example, as being a mesh filter, a sintered metal filter, or a fiber metal filter. The filter element 242 for each of the filters 232, 234, 236 need not be the same, but instead may have different constructions. For example, the filter element 242 for the coarse filter 232 may be a mesh filter, but the filter element 242 for the fine filter 236 may be a fiber metal filter. As noted above, the filters 232, 234, 236 are exposed to high temperatures and the filter element 242 of each filter 232, 234, 236 is preferably made of materials suitable to withstand such an environment. When a metal is used in constructing filter element 242, the metal is preferably corrosion resistant in the high temperature fuel environment, and, more specifically, has good corrosion resistance to sulfur and to sulfur compounds. Materials such as stainless steel may be avoided because of the susceptibility to corrosion at high temperatures. Suitable materials may include, for example, nickel-based alloys and more preferably nickel-chromium-based alloys, such as Inconel® alloys, for example.

As shown in FIG. 3, the fuel system 200 also may include the de-oxygenation system 224 that is configured to reduce the amount of oxygen in the fuel. Oxygen in the fuel may be a contributor to thermal oxidation of the fuel and the generation of coke, particularly, at temperatures greater than three hundred degrees Fahrenheit. In this embodiment, the de-oxygenation system 224 is in fluid communication with the fuel delivery assembly 202 at a position upstream of the performance heat exchanger 222 such that the de-oxygenation system 224 reduces the oxygen content of the fuel supplied to the performance heat exchanger 222. As shown in FIG. 3, the de-oxygenation system 224 also is upstream of the fuel metering unit 220 and the main fuel pump 212. The de-oxygenation system 224 is downstream of the main filter 218, and, more specifically, directly downstream of the main filter 218. A suitable de-oxygenation system 224 is the fuel oxygen reduction units shown and described in U.S. Patent Application Publication No. 2020/0140114, the disclosure of which is incorporated by reference herein in its entirety. The fuel provided by the de-oxygenation system 224 may have an oxygen content of less than five parts per million ("ppm"), such as less than three ppm, such as less than two ppm, such as less than one ppm, and such as less than a half ppm.

In the embodiment depicted in FIG. 3, a bypass valve 226 is positioned in fluid communication with the fuel delivery assembly 202 between (downstream of) the main fuel pump 212 and (upstream of) the fuel metering unit 220. The bypass valve 226 includes a bypass fluid connection that connects the bypass valve 226 with a position upstream of the main fuel pump 212 such that fuel in the fuel delivery assembly 202 can bypass the fuel nozzles 152 and other components downstream of the bypass valve 226 and recirculate the fuel back to the main fuel pump 212.

Fuel may be used to operate various components of the engine 100. A servo system 228 may be used for such operation. In this embodiment, the servo system 228 is connected to the fuel delivery assembly 202 at a position upstream of the bypass valve 226 and the fuel metering unit 220 and downstream of the main filter 218 to receive the hydrocarbon fuel from the fuel distribution assembly. In this embodiment, the connection is between the main fuel pump 212 and the bypass valve 226. By such a position, the bypass valve 226 may be positioned to recirculate the fuel, and the fuel is still provided to the servo system 228. A fuel return from the servo system 228 is connected to the fuel delivery assembly 202 at a position upstream of the main fuel pump 212. The fuel system 200 may also include other components and systems not specifically depicted in FIG. 3.

Figure 6:
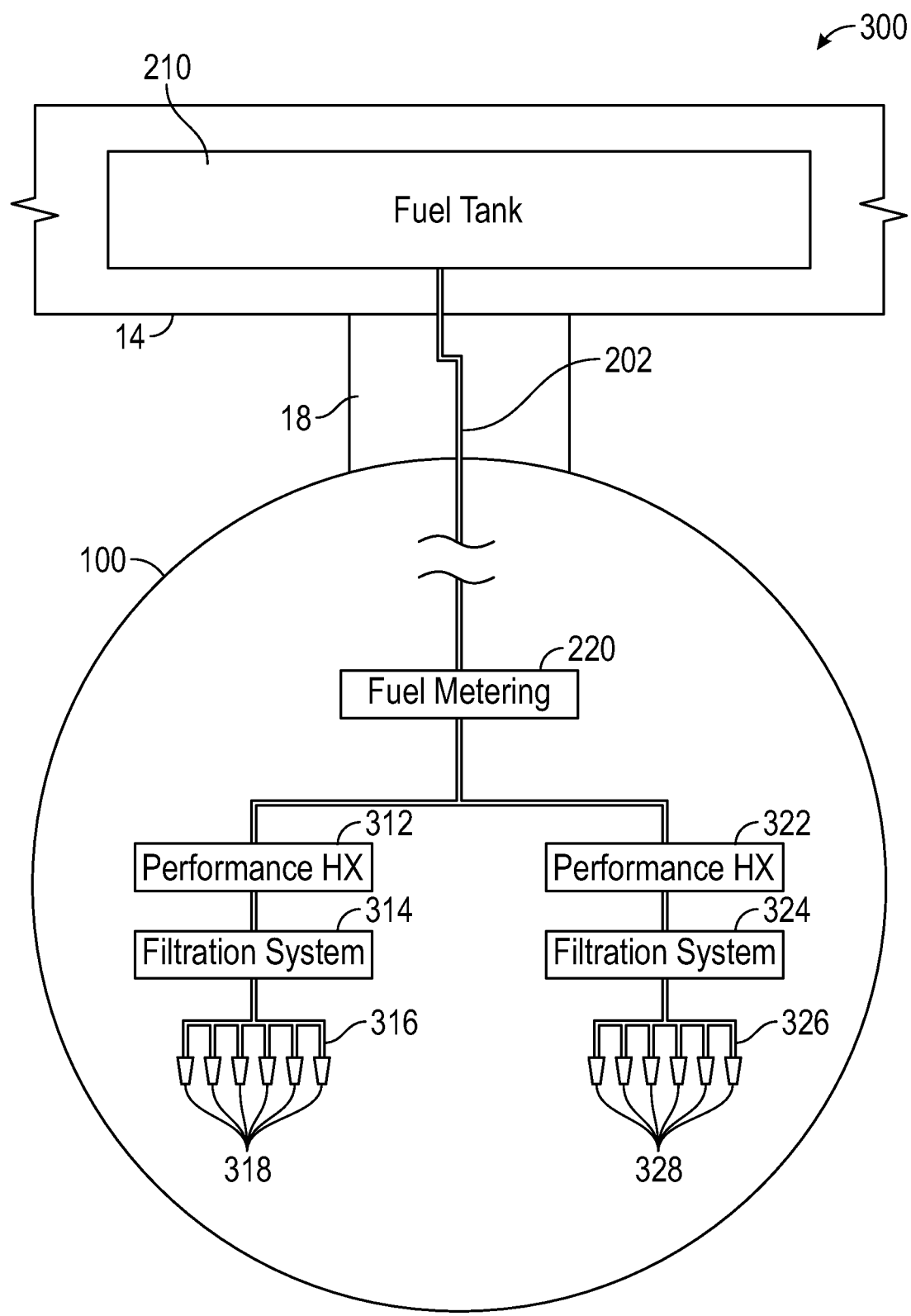
FIG. 6 is a schematic of a portion of the fuel system according to an embodiment of the present disclosure.

FIG. 6 is a schematic view of a portion of a fuel system 300 according to another embodiment of the present disclosure. In some gas turbine engines 100, a plurality of sets of fuel nozzles may be used with fuel being distributed to each set of fuel nozzles by a separate fuel manifold. In the fuel system 300 shown in FIG. 6, for example, the gas turbine engine 100 includes a first set of fuel nozzles 318 and a second set of fuel nozzles 328. The components of the fuel system 300 shown in FIG. 6 upstream of the fuel metering unit 220, and including the fuel metering unit 220, are the same as those shown and described in FIG. 3 and a detailed discussion of those components is omitted here. In addition, some of those components have been omitted from FIG. 6 for clarity.

The fuel system 300 of this embodiment includes a first fuel manifold 316 and a second fuel manifold 326. The first fuel manifold 316 and the second fuel manifold 326 operate in a manner similar to the fuel manifold 156 discussed above in FIG. 3. The first fuel manifold 316 is configured to distribute fuel to the first set of fuel nozzles 318, and the second fuel manifold 326 is configured to distribute fuel to the second set of fuel nozzles 328.

The fuel system 300 of this embodiment also includes a plurality of performance first heat exchangers, a first heat exchanger 312 and a second heat exchanger 322. The first heat exchanger 312 and the second heat exchanger 322 are performance heat exchangers that operate in the same manner as the performance heat exchanger 222 discussed above. The fuel metering unit 220 is configured to provide a desired volume of fuel, at, for example, a desired flow rate, to each of the first fuel manifold 316 and the second fuel manifold 326 via the first heat exchanger 312 and second heat exchanger 322, respectively. In this configuration, the fuel system 300 also includes a plurality of coke filtration systems, a first coke filtration system 314 and a second coke filtration system 324. Each of the first coke filtration system 314 and the second coke filtration system 324 is configured to operate like the coke filtration system 230 discussed above and to remove coke from the fuel after the first heat exchanger 312 and second heat exchanger 322, and before fuel is distributed to the first set of fuel nozzles 318 and the second set of fuel nozzles 328. In this embodiment, the first coke filtration system 314 is positioned downstream of the first heat exchanger 312 and, more specifically, directly downstream of the first heat exchanger 312. The first coke filtration system 314 is also positioned upstream of the first fuel manifold 316 and, more specifically, directly upstream of the first fuel manifold 316. Similarly, the second coke filtration system 324 is positioned downstream of the second heat exchanger 322 and, more specifically, directly downstream of the second heat exchanger 322. The second coke filtration system 324 is also positioned upstream of the second fuel manifold 326 and, more specifically, directly upstream of the second fuel manifold 326.

Further aspects of the present disclosure are provided by the subject matter of the following clauses.

A fuel system includes a fuel metering unit, a heat exchanger, a plurality of fuel nozzles, and a coke filtration system. The fuel metering unit is configured to meter a flow of a hydrocarbon fuel. The heat exchanger is fluidly connected to the fuel metering unit downstream of the fuel metering unit to receive the flow of the hydrocarbon fuel. The heat exchanger is configured to heat the hydrocarbon fuel. The plurality of fuel nozzles is fluidly connected to the heat exchanger downstream of the heat exchanger to receive the hydrocarbon fuel heated by the heat exchanger. The coke filtration system includes at least one filter. The coke filtration system is located upstream of the plurality of fuel nozzles and directly downstream of the heat exchanger.

The fuel system of the preceding clause, including a fuel manifold fluidly connected to the heat exchanger downstream of the heat exchanger and configured to distribute the heated fuel to the plurality of fuel nozzles. The fuel manifold is downstream of the coke filtration system.

The fuel system of any preceding clause, wherein the heat exchanger is configured to heat the hydrocarbon fuel to a temperature from three hundred degrees Fahrenheit to nine hundred degrees Fahrenheit.

The fuel system of any preceding clause, wherein the heat exchanger is thermally coupled to an intermediate thermal transfer system to receive heat from a hot gas path of an engine.

The fuel system of any preceding clause, wherein the at least one filter is a sintered metal filter or a fiber metal filter.

The fuel system of any preceding clause, wherein the at least one filter includes a filter element that is a nickel-chromium-based alloy.

The fuel system of any preceding clause, wherein the at least one filter includes a filter element having an upstream surface. The upstream surface of the filtering element is pleated.

The fuel system of any preceding clause, including a de-oxygenation system fluidly connected to the heat exchanger upstream of the fuel metering unit and configured to reduce the concentration of oxygen in the hydrocarbon fuel.

The fuel system of any preceding clause, wherein the coke filtration system includes a plurality of filters in series.

The fuel system of any preceding clause, wherein the coke filtration system includes a filter assembly and each of the plurality of filters includes an annular filter element. The filter element of a first filter being positioned radially outward from the filter element of a second filter.

The fuel system of any preceding clause, wherein the first filter is a coarse filter and the second filter is a fine filter having a micron rating less than the coarse filter, and wherein fuel is configured to flow through the filter element of each of the coarse filter and the fine filter in a radially inward direction.

The fuel system of any preceding clause, wherein the plurality of filters includes a coarse filter, a medium filter, and a fine filter. The coarse filter has a micron rating greater than the medium filter, the medium filter having a micron rating greater than the fine filter.

The fuel system of any preceding clause, wherein the coarse filter has a nominal micron rating from thirty microns to eighty microns.

The fuel system of any preceding clause, wherein the medium filter has a nominal micron rating from fifteen microns to sixty microns.

The fuel system of any preceding clause, wherein the fine filter has a nominal micron rating from a half micron to forty microns.

A fuel system includes a fuel metering unit, a first heat exchanger, a first set of fuel nozzles, a first coke filtration system, a second heat exchanger, a second set of fuel nozzles, and a second coke filtration system. The fuel metering is configured to meter a flow of a hydrocarbon fuel. The first heat exchanger is fluidly connected to the fuel metering unit downstream of the fuel metering unit to receive the flow of the hydrocarbon fuel. The first heat exchanger is configured to heat the hydrocarbon fuel. The first set of fuel nozzles is fluidly connected to the first heat exchanger downstream of the first heat exchanger to receive the hydrocarbon fuel heated by the first heat exchanger. The first coke filtration system includes at least one filter. The first coke filtration system is located upstream of the first set of fuel nozzles and directly downstream of the first heat exchanger. The second heat exchanger is fluidly connected to the fuel metering unit downstream of the fuel metering unit to receive the flow of the hydrocarbon fuel. The second heat exchanger is configured to heat the hydrocarbon fuel. The second set of fuel nozzles fluidly is connected to the second heat exchanger downstream of the second heat exchanger to receive the hydrocarbon fuel heated by the second heat exchanger. The second coke filtration system includes at least one filter. The second coke filtration system is located upstream of the second set of fuel nozzles and directly downstream of the second heat exchanger.

The fuel system of any preceding clause, wherein each of the first coke filtration system and the second coke filtration system include a plurality of filters in series.

The fuel system of any preceding clause, wherein the plurality of filters of each of the first coke filtration system and the second coke filtration system includes a coarse filter, a medium filter, and a fine filter. The coarse filter having a micron rating greater than the medium filter, the medium filter having a micron rating greater than the fine filter.

A gas turbine engine includes a lubrication system containing oil flowing therethrough and the fuel system of any preceding clause, wherein the fuel system further comprises a preheater, a main filter, and a fuel pump. The preheater is fluidly connected to the fuel metering unit upstream of the fuel metering unit. The preheater is configured to heat the hydrocarbon fuel. The preheater is a heat exchanger fluidly connected to the lubrication system to extract heat from the oil of the lubrication system and to heat the hydrocarbon fuel. The main filter is fluidly connected to the preheater downstream of the preheater to receive the hydrocarbon fuel heated by the preheater. The main filter is located upstream of the fuel metering unit. The fuel pump is fluidly connected to the fuel metering unit upstream of the fuel metering unit and downstream of the main filter.

A gas turbine engine including the fuel system of the preceding clause, a compressor section, a combustor, and a turbine section. The compressor section is configured to compress air. The combustor includes a combustion chamber. The plurality of fuel nozzles is configured to inject the hydrocarbon fuel into the combustion chamber. The combustor is configured to mix air with the hydrocarbon fuel to form a fuel and air mixture and to combust the fuel and air mixture forming combustion products. The turbine section is configured to receive the combustion products. The turbine section has at least one turbine configured to be driven by the combustion products. The heat exchanger is thermally connected to one of the compressor section, the combustor, or the turbine section to receive heat and heat the hydrocarbon fuel.

Although the foregoing description is directed to the preferred embodiments, other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A fuel system for a gas turbine engine, the fuel system comprising:
   a fuel metering unit configured to meter a flow of a hydrocarbon fuel;
   a heat exchanger fluidly connected to the fuel metering unit downstream of the fuel metering unit to receive the flow of the hydrocarbon fuel, the heat exchanger being configured to heat the hydrocarbon fuel to a temperature from four hundred degrees Fahrenheit to nine hundred degrees Fahrenheit;
   a plurality of fuel nozzles fluidly connected to the heat exchanger downstream of the heat exchanger to receive the hydrocarbon fuel heated by the heat exchanger; and
   a coke filtration system including a plurality of filters in series, each filter of the plurality of filters including a filter element formed of a metal, a filter of the plurality of filters has a nominal micron rating from a half micron to forty microns, the coke filtration system being located upstream of the plurality of fuel nozzles and directly downstream of the heat exchanger.

2. The fuel system of claim 1, further comprising a fuel manifold fluidly connected to the heat exchanger downstream of the heat exchanger and configured to distribute the heated fuel to the plurality of fuel nozzles, the fuel manifold being downstream of the coke filtration system.

3. The fuel system of claim 2, wherein the coke filtration system is directly upstream of the fuel manifold.

4. The fuel system of claim 1, wherein the heat exchanger is thermally coupled to an engine to receive heat from a hot gas path of the engine.

5. The fuel system of claim 1, wherein each filter element is a sintered metal filter or a fiber metal filter.

6. The fuel system of claim 1, wherein the metal of each filter element is a nickel-chromium-based alloy.

7. The fuel system of claim 1, wherein each filter element has an upstream surface, the upstream surface of the filtering element being pleated.

8. The fuel system of claim 1, further comprising a de-oxygenation system fluidly connected to the heat exchanger upstream of the fuel metering unit and configured to reduce the concentration of oxygen in the hydrocarbon fuel.

9. The fuel system of claim 1, wherein the coke filtration system includes a filter assembly and the filter element of each of the plurality of filters is annular, the filter element of a first filter being positioned radially outward from the filter element of a second filter.

10. The fuel system of claim 9, wherein the first filter is a coarse filter and the second filter is a fine filter having a micron rating less than the coarse filter, and
wherein the filter assembly is configured to flow fuel through the filter element of each of the coarse filter and the fine filter in a radially inward direction.

11. The fuel system of claim 1, wherein the plurality of filters includes a coarse filter, a medium filter, and a fine filter, the coarse filter having a micron rating greater than the medium filter, the medium filter having a micron rating greater than the fine filter.

12. The fuel system of claim 11, wherein the coarse filter has a nominal micron rating from thirty microns to eighty microns.

13. The fuel system of claim 11, wherein the medium filter has a nominal micron rating from fifteen microns to sixty microns.

14. The fuel system of claim 11, wherein the fine filter has the nominal micron rating from a half micron to forty microns.

15. A gas turbine engine comprising:
a lubrication system containing oil flowing therethrough; and
the fuel system of claim 1, wherein the fuel system further comprises:
a preheater fluidly connected to the fuel metering unit upstream of the fuel metering unit, the preheater being configured to heat the hydrocarbon fuel, the preheater being a heat exchanger fluidly connected to the lubrication system to extract heat from the oil of the lubrication system and to heat the hydrocarbon fuel;
a main filter fluidly connected to the preheater downstream of the preheater to receive the hydrocarbon fuel heated by the preheater, the main filter being located upstream of the fuel metering unit; and
a fuel pump fluidly connected to the fuel metering unit upstream of the fuel metering unit and downstream of the main filter.

16. A gas turbine engine comprising:
the fuel system of claim 1;
a compressor section configured to compress air;
a combustor including a combustion chamber, the plurality of fuel nozzles being configured to inject the hydrocarbon fuel into the combustion chamber, the combustor being configured to mix the compressed air with the hydrocarbon fuel to form a fuel and air mixture and to combust the fuel and air mixture forming combustion products; and
a turbine section configured to receive the combustion products, the turbine section having at least one turbine configured to be driven by the combustion products,
wherein the heat exchanger is thermally connected to one of the compressor section, the combustor, or the turbine section to receive heat and heat the hydrocarbon fuel.

17. A fuel system for a gas turbine engine, the fuel system comprising:
a fuel metering unit configured to meter a flow of a hydrocarbon fuel;
a first heat exchanger fluidly connected to the fuel metering unit downstream of the fuel metering unit to receive the flow of the hydrocarbon fuel, the first heat exchanger being configured to heat the hydrocarbon fuel to a temperature from four hundred degrees Fahrenheit to nine hundred degrees Fahrenheit;
a first plurality of fuel nozzles fluidly connected to the first heat exchanger downstream of the first heat exchanger to receive the hydrocarbon fuel heated by the first heat exchanger;
a first coke filtration system including a plurality of filters in series, each filter of the plurality of filters including a filter element formed of a metal, a filter of the plurality of filters has a nominal micron rating from a half micron to forty microns, the first coke filtration system being located upstream of the first plurality of fuel nozzles and directly downstream of the first heat exchanger;
a second heat exchanger fluidly connected to the fuel metering unit downstream of the fuel metering unit to receive the flow of the hydrocarbon fuel, the second heat exchanger being configured to heat the hydrocarbon fuel;
a second set of fuel nozzles fluidly connected to the second heat exchanger downstream of the second heat exchanger to receive the hydrocarbon fuel heated by the second heat exchanger; and
a second coke filtration system including at least one filter, the second coke filtration system being located upstream of the second set of fuel nozzles and directly downstream of the second heat exchanger.

18. The fuel system of claim 17, wherein the second coke filtration system includes a plurality of filters in series.

19. The fuel system of claim 18, wherein the plurality of filters of each of the first coke filtration system and the second coke filtration system includes a coarse filter, a medium filter, and a fine filter, the coarse filter having a micron rating greater than the medium filter, the medium filter having a micron rating greater than the fine filter.

* * * * *